(12) United States Patent
Brodt et al.

(10) Patent No.: US 10,380,143 B2
(45) Date of Patent: Aug. 13, 2019

(54) MERGING OF DISTRIBUTED DATASETS

(71) Applicant: International Business Machines Corporation, Armonk, NY (US)

(72) Inventors: Andreas Brodt, Gerlingen (DE); Alexander Lang, Stuttgart (DE); Oliver Schiller, Dettingen/Teck (DE); Knut Stolze, Hummelshain (DE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 284 days.

(21) Appl. No.: 15/270,031

(22) Filed: Sep. 20, 2016

(65) Prior Publication Data

US 2017/0083515 A1 Mar. 23, 2017

(30) Foreign Application Priority Data

Sep. 22, 2015 (GB) .................................. 1516727.3

(51) Int. Cl.
*G06F 16/27* (2019.01)

(52) U.S. Cl.
CPC .......... *G06F 16/278* (2019.01); *G06F 16/273* (2019.01)

(58) Field of Classification Search
USPC ....................................................... 707/627
See application file for complete search history.

(56) References Cited

U.S. PATENT DOCUMENTS

| | | | |
|---|---|---|---|
| 7,016,903 B1 | 3/2006 | Thusoo et al. | |
| 7,373,357 B2 | 5/2008 | Iyer et al. | |
| 9,628,535 B2 * | 4/2017 | Carlson | G06F 15/17318 |
| 2012/0265890 A1 * | 10/2012 | Carlson | G06F 15/17318 709/231 |
| 2013/0226902 A1 | 8/2013 | Lariba-Pey et al. | |
| 2014/0280024 A1 | 9/2014 | Baskett et al. | |

OTHER PUBLICATIONS

Brodt et al., "Method and System for Merging Data Sets in Very Large Distributed Databases", Jun. 29, 2015; 8 pages.
Wikipedia, "Data stream management system," https://en.wikipedia.org/wiki/Data_stream_management_system, Jul. 27, 2015; 5 pages.

* cited by examiner

*Primary Examiner* — Jean B Fleurantin
(74) *Attorney, Agent, or Firm* — Cantor Colburn LLP; Robert Bunker

(57) ABSTRACT

Aspects include operating a distributed database that includes multiple computing nodes that are connected via a network for exchanging data, and a database management system for managing a source dataset and a target dataset. The target dataset is stored in a distributed fashion across the multiple computing nodes. The method includes repeatedly, using the multiple computing nodes, checking for a matching condition between a source element selected from a source dataset and one of multiple target elements in the target dataset. The multiple computing nodes are used to calculate a command set of a merged command list of commands to merge the source element with the target element using the matching condition. The command set is executed to merge the source element with the target dataset before checking for the matching condition between a next source element selected from the multiple source element and one of the multiple target elements.

19 Claims, 4 Drawing Sheets

MERGING OF DISTRIBUTED DATASETS

BACKGROUND

The present invention relates to the field of distributed databases and more particularly, to the merging of distributed datasets.

The merging of datasets in distributed database systems may be computationally intensive or involve the movements of large amounts of data between different computational nodes of the distributed database system.

SUMMARY

Embodiments include a method, system, and computer program product for operating a distributed database. The distributed database includes multiple computing nodes for implementing storage and computation for a database management system. The multiple computing nodes are connected via a network for exchanging data. The distributed database also includes a database management system for managing a source dataset and a target dataset. The target dataset is stored in a distributed fashion across the multiple computing nodes and includes multiple target elements. The source dataset includes multiple source elements. The method includes repeatedly, using the multiple computing nodes, checking for a matching condition between a source element selected from the multiple source elements and one of the multiple target elements. The multiple computing nodes are used to calculate a command set of a merged command list of commands to merge the source element with the target element using the matching condition. The command set is executed to merge the source element with the target dataset before checking for the matching condition between a next source element selected from the multiple source element and one of the multiple target elements.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, in which:

DETAILED DESCRIPTION

Figure 1:
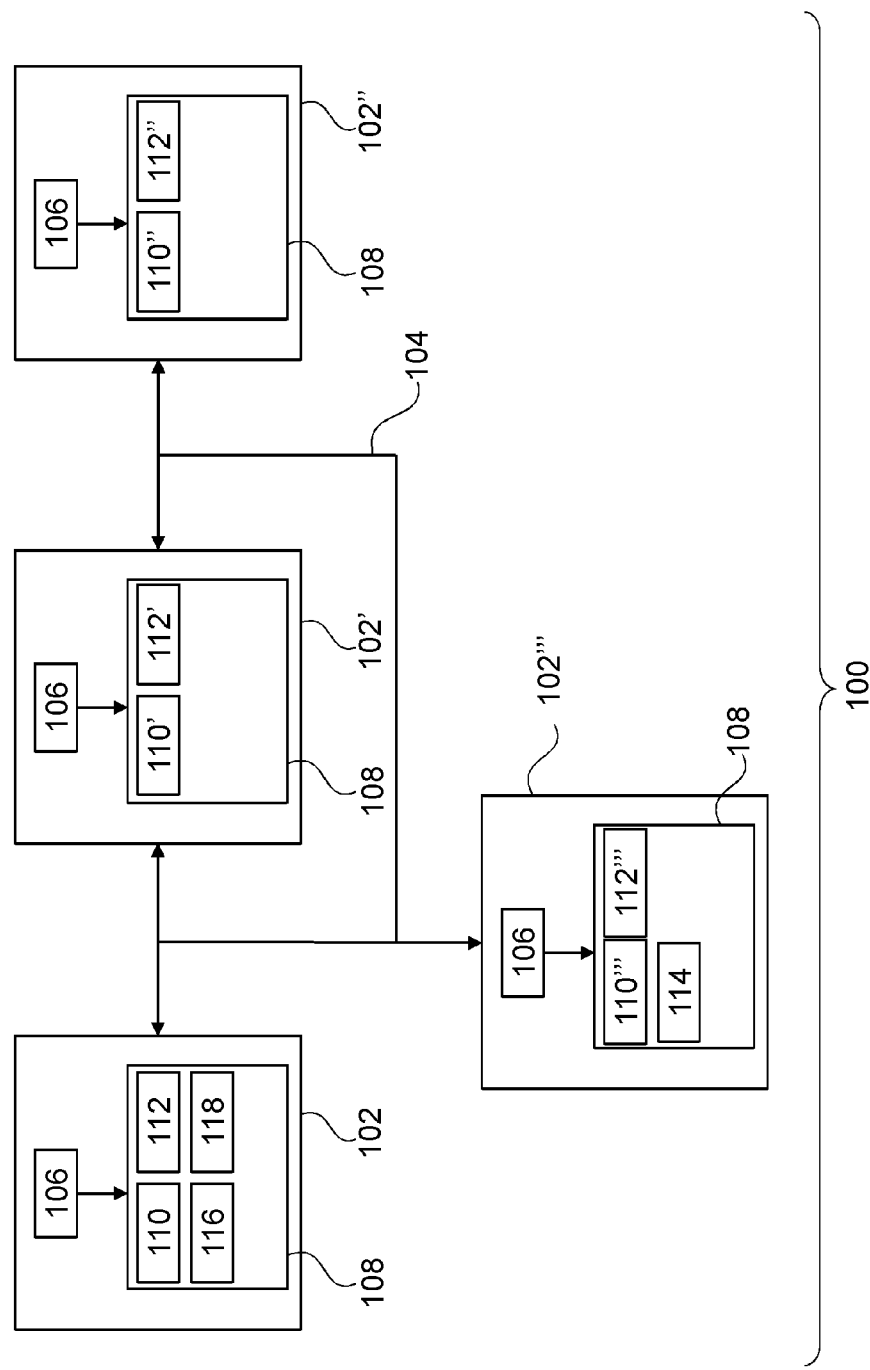
FIG. 1 illustrates an example of a distributed database in accordance with one or more embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments include a method of operating a distributed database that includes multiple computing nodes that are connected via a network for exchanging data. The distributed database also includes a database management system for managing a source dataset and a target dataset that is stored in a distributed fashion across the multiple computing nodes. The method includes repeatedly, using the multiple computing nodes, checking for a matching condition between a source element selected from the multiple source elements and one of the multiple target elements. A command set of a merged command list is calculated to merge the source element with the target element using the matching condition. The command set is executed to merge the source element with the target dataset before checking for the matching condition between a next source element selected from the multiple source element and one of the multiple target elements. In accordance with one or more embodiments described herein, the complete merged command list is not calculated before executing the individual command sets. This may reduce the amount of machine or processor resources which are needed to merge the source dataset with the target dataset.

Embodiments also include a method of merging a target data object and a source data object stored on multiple computing nodes. The target data object includes first data records being distributed on the multiple computing nodes, and the source data object includes second data records distributed on the multiple computing nodes. The method incudes executing a join command to merge the source data object with the target data object. Execution of the join command includes repeatedly checking for a matching condition between a second data record selected from the second data records and one of the first data records. Execution of the join command also includes calculating a command list to merge the second data record with one of the first data records using the matching condition. The method further includes executing the command list before calculating a next command list.

Embodiments further include a method of merging a data stream with a static data object that is stored on multiple computing nodes. The static data object includes multiple records distributed on the multiple computing nodes. The method includes executing a join command to merge the data stream with the static data object. The execution of the join command includes repeatedly checking for a matching condition between a portion of the data stream and a selected data record selected from the static data object. The method further includes repeatedly calculating a command list to merge the portion of the data stream and the selected data record using the matching condition. The method further includes repeatedly executing the command list before calculating a next command list. This can provide an efficient means of merging a static dataset with a data stream, and allow the same system used for merging two static datasets to be used to merge a data stream with a static dataset.

In another embodiment, the command set is deleted before calculating a next matching condition between the next source element selected from the multiple source elements and one of the multiple target elements. This can reduce the computational burden of merging the source dataset and the target dataset. This can also allow the command set to be executed immediately before the source dataset or the target dataset to be modified.

In another embodiment, each of the multiple nodes comprises a main memory. The command set is calculated by a selected node of the multiple nodes. The command set remains in the main memory of the selected node. In accordance with this embodiment, the command set does not need to be transferred between any of the multiple computing nodes before it is executed which may increase the speed at which the command set is executed.

In another embodiment, the command set includes inserts, updates, and/or deletes, as well as a storage location of the target dataset. The command set can be configured to be applied to the target dataset and used for merging two data elements.

In another embodiment, the command set further includes attribute values to be entered for the target data element upon merging the source element with the target dataset. This can allow the attribute or value which is to be entered to be copied directly using the command set.

In another embodiment, a number of inserts, updates, and delete performed for a complete merge command list are counted separately to provide detailed statistics on the operations which were performed to merge the source dataset and the target dataset.

In another embodiment, the distributed database is a distributed shared-nothing database which can provide for a particularly efficient method of merging a source dataset and a target dataset stored within a distributed shared-nothing database.

In another embodiment, the distributed database is a distributed relational database, the source dataset is a source table, and the target dataset is a target table. In addition, the multiple source elements are multiple source rows, the multiple target elements are multiple target rows, the source element is a source row, and the command set is a command column. This can result in increased efficiency when merging source datasets and target datasets of relational databases.

In another embodiment, the source dataset and/or the target dataset are modified during the execution of the command set. This can result in increased efficiency when updating both the source dataset and/or the target dataset.

In another embodiment, the source dataset contains multiple copies of the source element and/or the target dataset containing multiple copies of the target element. In this embodiment, even if the data is stored in multiple locations on different computing nodes the method can still be performed rapidly and efficiently.

In another embodiment, the repeated execution of the command set results in a join set distributed on the set of computing nodes. In this embodiment, the source dataset and the target dataset are replaced or copied into a join set. The method may provide a particularly efficient method of creating the join set.

In another embodiment, the join set may be a join table. For example, the join table may be a table in a distributed relational database.

In another embodiment, the merged command list is a list of commands for merging the source dataset into the target dataset. This can provide a particularly efficient means of merging the source dataset into the target dataset.

In another embodiment the source dataset and/or the target dataset is a static dataset. This can be helpful when the data being merged includes a portion which is stored statically across multiple computing nodes.

In another embodiment, the source dataset is stored in a distributed fashion across the multiple computing nodes. This can be helpful when merging two sets of data that are both stored across multiple computing nodes. The multiple computing nodes may be used to rapidly perform the merging in a parallel fashion.

In another embodiment, the source dataset is at least one data stream. This can be helpful when the data stream contains data from several different sources. If the data is merged into the target dataset which is static the multiple computing nodes may be used to merge the at least one data stream in a parallel fashion and store them.

In another embodiment the data stream is provided by a sensor network that includes data from multiple sensors. This can allow efficient merging of the data stream with the target dataset.

In another embodiment, the command list is deleted before calculating a next matching condition between a next second data record selected from the second data records and one of the multiple target elements.

FIG. 1 shows an example of a distributed database 100 in accordance with one or more embodiments. The distributed database includes computing nodes 102, 102', 102" and 102'". The various computing nodes 102, 102', 102", 102'" are connected by a network connection 104. The network connection 104 enables the computing nodes 102, 102', 102", 102'" to exchange data. Each computing node 102, 102', 102", 102'" includes a processor 106 and storage 108. The storage 108 may be either main memory or it may be long term memory such as a hard drive or flash memory. The computing node 102 includes a portion of the source dataset 110 and a portion of a target dataset 112 in the storage 108. The computing node 102' contains a different portion of the source dataset 110 and a different portion of the target dataset 112' in its storage.

The computing node 102" contains a different portion of the source dataset 110" and a different portion of the target dataset 112" in its storage 108. The computing node 102'" contains yet a different portion of the source dataset 110'" and yet a different portion of the target dataset 112'" in its storage 108. The portions of the target dataset 112, 112', 112", 112'" may for example contain data in the form of one or more multiple target elements. The portions of the source dataset 110, 110', 110", 110'" may for example contain data in the form of one or more source target elements.

The computing node 102'" is shown as containing an implementation of a database management system in its storage 108. The implementation of the database management system 114 enables the computing node 102'" to control the database system formed by the computing nodes 102, 102', 102", 102'". In other examples the database management system 114 may be implemented on a separate computer or computational node and in some instances may be separate from the distributed database 100.

The database management system 114 for instance could, for example, receive a SQL command or other command which instructs the database management system to join the source dataset and the target dataset. The database management system 114 may then issue commands to the various computing nodes 102, 102', 102" or 102'" to join the various portions of the source and target datasets. The computational node 102 shows in its storage 108 a matching condition 116 that was identified for the portion of the source dataset 110 and the portion of the target dataset 112. This may result in the processor 106 calculating a command set 118 which enables the processor 106 to merge the portion of the source dataset 110 and the portion of the target dataset 112.

Figure 2:
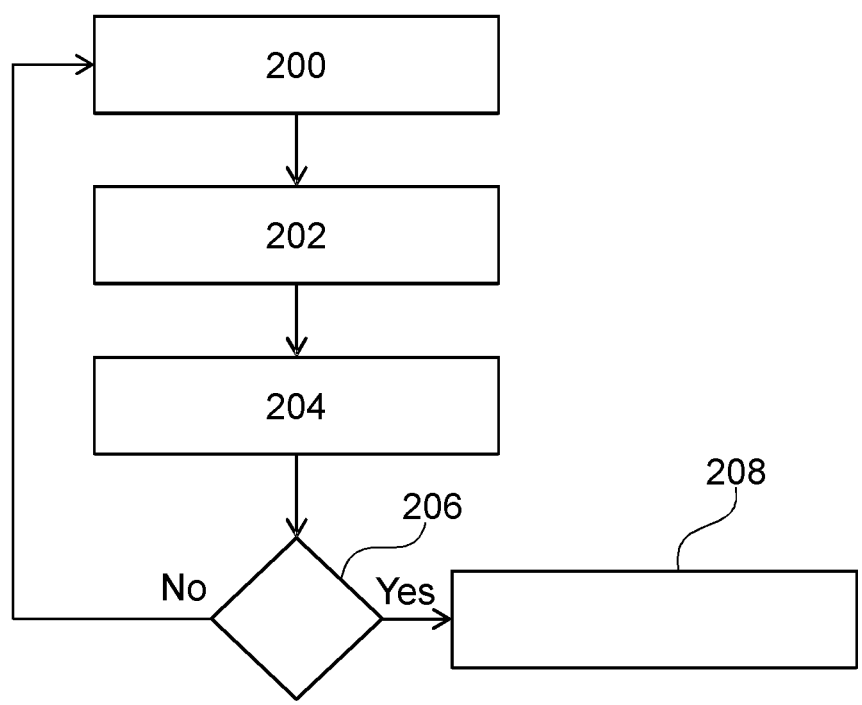
FIG. 2 depicts a method of operating the distributed database of FIG. 1 in accordance with one or more embodiments.

FIG. 2 shows a flowchart which illustrates an example of a method of operating the distributed database of FIG. 1 in accordance with one or more embodiments. In block 200 the multiple computing nodes 102, 102', 102", 102''' check for a matching condition 116 between a source element in the source dataset 110 and a target element in the target dataset 112. At block 202, the processor 106 of computing node 102 calculates a command set 118 of a merged command list. The command list includes a list of commands to merge the source element in the source dataset 110 with the target element in the target dataset 112. At block 204, the processor 106 executes the command set 118 to merge the source dataset 110 with the target dataset 112. This is done before checking for the matching condition between the next source element selected from the multiple source elements and one of the multiple target elements.

The execution of the command is then performed on the fly instead of waiting until the completed merged command list is calculated. Subsequent to block 204, the method continues at block 206. This is a decision box in which the question is 'are all source elements selected?' If the answer is yes, then the method goes to block 208 and the method ends. If the answer is no, then the method returns to block 200 and the next source element is checked for a matching condition.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein the merge command list may also be described as a merge action table. As used herein the command set may also be referred to as a command column. As used here tables may refer to a source dataset or a target dataset depending upon the context. As used herein column of tables may refer to source element of the source dataset or a target element of a target dataset depending upon the context. The following discussion is descriptive of merging relational database data using an SQL MERGE command. The general method is however applicable to other types of data storage and also to merging data streams with static data.

Synchronizing or merging different datasets is a task which occurs often in information systems. More specifically, merging changes made in a first dataset with a second dataset based on the existence of the particular data object (e.g., row) in the second dataset, and possibly further conditions can be a common task. In the SQL language, the MERGE statement has been defined for this task in the context of relational databases. Code Listing 1 below gives an example of an SQL MERGE statement: a so-called target table (emp) is modified using a source table (SELECT*FROM worldwide_emp . . . ). Source and target tables are compared using a matching condition which tests whether a corresponding row exists in the target table for every source row. Based on the matching condition and further conditions modification steps (insert, update or delete) are defined.

---

Code Listing 1: Example of a complex MERGE SQL statement

MERGE INTO emp AS t
USING (SELECT * FROM worldwide_emp WHERE country = 'GER') AS s
ON t.id = s.id
WHEN MATCHED AND s.isFired = 1 THEN
    DELETE
WHEN MATCHED AND t.salary < s.salary THEN
    UPDATE SET t.salary = s.salary, t.bonus = s.bonus / 2
WHEN MATCHED THEN
    UPDATE SET t.bonus = 0
WHEN NOT MATCHED AND s.bonus > (SELECT AVG(salary) FROM emp) THEN
    INSERT (id, name, salary, bonus)
        VALUES (s.id, s.name, s.salary, s.bonus / 2)
WHEN NOT MATCHED THEN
    INSERT (id, name, salary, bonus)
        VALUES (s.id, s.name, s.salary, s.bonus)

---

The general problem, however, is not restricted to relational databases. Throughout this document, for simplicity, the managed data objects (elements of datasets) will be referred to as "rows" and datasets as "tables" even though the presented example could be used just as well in non-relational data management systems. The same problem exists in massively distributed non-SQL key/value stores, for example, which do not offer this functionality.

In addition, the source table could be a continuous data stream provided by, for example, a sensor which requires a solution that is capable of processing the merge operation in stream oriented fashion, thus generation of a continuous stream of insert, update and/or delete actions. Moreover, data stream systems also have such requirements, for example, when merging continuous data streams from multiple sensors. Sensors may or may not have a data point available matching the data from another sensor. Hence, the merge operations has to consider all the different cases of inserting a new data point to modifying an existing data point, to removing other data under various conditions.

Finally, in the general case (which is not supported by the MERGE SQL statement), modifications might be required in both directions, thus not only modifying the target table, but also the source table. Existing systems do not support this and are only capable of modifying the target table.

In order to manage very large tables, distributed databases can distribute the rows of a table across many compute nodes. The rows can be distributed randomly or using a deterministically distribution function based on one or more columns of the table, such columns are referred to as distribution keys. In the former case, it is unknown where a particular row is located. In the latter case, the location of a row may be computed if the respective attributes of the data are known, otherwise it must be assumed to be anywhere. Two examples can be distinguished here: shared-nothing databases disjointly distribute the rows, whereas others may allow several copies of a row to exist on different nodes.

Merging data (as described above) is difficult in such systems, for at least the following reasons:

1. In order to test the matching condition the location of the potentially matching target row must be known and can be located on the same or on a different compute node than the source row.
2. For efficient execution it is desirable to exploit the location of the rows to avoid unnecessary data movements.
3. The compute node on which the match condition is tested may not be the same node which owns the rows that need manipulation (insert/update/delete).
4. Update actions of a merge operation may force a row to move to a new location. This happens when the location is determined deterministically and the update action changes a distribution key. In this case, the old version of the row must be deleted from the old location and inserted into the new location, so that data movement cannot be avoided in this case. Also note that this implies the requirement to allow updating distribution keys in the first place. Some systems disallow this, to avoid moving rows in update operations.
5. In the end it would be desirable to report the numbers of rows that were inserted, update or deleted in each table individually. Particularly in the aforementioned case where an update inserts into and deletes from different compute nodes, is not straight-forward, as the nodes which execute the data manipulation do not see the whole picture.
6. In non-shared-nothing systems, several copies of a row may exist and all of them need to be manipulated. Existing systems do not support this.

Distributed shared-nothing databases are typically capable of executing distributed joins. The following examples exist, naturally such systems are also capable of determining the ideal approach for executing a particular join.

Co-located join: The joined tables are both distributed deterministically and the join predicate is based on the distribution keys of both tables. For equi-joins this guarantees that matching rows can only be located in the same partition (and thus on the same compute node). The join can be computed locally without any data movement.

Broadcast: If one of the tables is small enough, it can be broadcast to all compute nodes. The join can then be computed locally. This works for all join types and even for a sufficiently small window of a continuous data stream.

Distribute: If one of the tables is distributed deterministically and the join predicate is based on the distribution keys then the rows of the other table can be distributed in the same fashion. After this distribution step, the assumptions of a co-located equi-join are met.

Double-distribute: The rows of both tables can be distributed deterministically across all compute nodes according to the column values of the equi-join predicate. Thus, a completely new partitioning is created on the fly. After this distribution step, the assumptions of a co-located equi-join are met.

Centralized execution: For small amounts of rows, all rows of both tables can be sent to one particular compute node which computes the join locally. This can be considered a special case of double distribute. This works for all join types and even for a sufficiently small window of a continuous data stream.

Note that, apart from a co-located join, all these examples move rows to different compute nodes. Thus, a row which is processed in a join on compute node x is potentially stored on a different node.

An embodiment that executes merge operations is based on a distributed join and consecutive streamlined processing of the join results. In this embodiment, every row is processed only once and data manipulation is executed locally as far as possible.

The matching condition may be translated into an outer join between the tables. The matching condition itself is becomes the join condition. For every table in which existence of a match is to be checked, a non-nullable column is projected as match indicator. For standard SQL MERGE, this is only the target table.

Nevertheless, in the general case matching could also be done against values that are missing in the source table, as in Microsoft SQL Server's syntax extension WHEN MATCHED BY SOURCE.

Moreover, for every table in which modifications are to be done, the storage location of every row is projected as an extra special column. Again, in standard SQL MERGE, only the target table can be modified, but in the general case this can be extended and examples describe herein may supports it. The storage location tells at least on which compute note the respective row is stored; it might (and should) be more detailed and include even the exact storage address. Details vary between implementations. As the storage location is non-nullable, the storage location can be used as match indicator column as well.

The join type is a full outer join in the general case. However, it can be narrowed down to a more efficient join type depending on the particular merge operation that is to be carried out. The influencing factors are whether or not both tables can be matched and the particular matching clauses used. Table 1 lists possibilities for a join reduction. All these join types share the property that they set the match indicator columns to a NULL value if the respective table did not contain a match for the given matching condition.

TABLE 1

The Join Types Used for the Matching Condition

| Matching Supported | Matching Clauses | Join Type |
|---|---|---|
| all | all | full outer join |
| only target | all | left outer join |
| all | only when matched | inner join |
| all | only when not matched | right not exists join |
| all | only when not matched by source | left not exists join |

Thus, using the various methods for executing distributed joins outlined above the matching condition can be efficiently calculated.

Carrying on the example of Code Listing 1, which supports only matching against the target table and uses both WHEN MATCHED and WHEN NOT MATCHED clauses, the following join query is generated:

SELECT . . . , t.storageLocation
FROM emp AS t
LEFT OUTER JOIN (SELECT*FROM worldwide_emp
    WHERE country='GER') AS s
ON t.id=s.id The storage location of the target table is projected as an extra field. As it is non-nullable, it can be used as match indicator: It can only contain a NULL value if the left outer join did not find a match.

Joining the two tables as explained above may only be a prerequisite. It allows evaluating the matching condition and provides the storage location of all matching rows which require manipulation. Embodiments described herein can build on top of this to compute the merge action table. The merge action table is the list of commands that need to be executed in order to carry out the merge operation. It may be computed on the fly in temporary storage and processed as a single stream of instructions. Every row of the merge action table originates from one matching test between source and target table, but may lead to several actions to be carried out.

The merge action table contains a command column which contains the actions to be executed. In addition to that it contains the storage location of rows to be deleted and new values to be inserted, for every table that needs modification. The command can be one of INSERT, UPDATE, and DELETE, for every table. If more than one table are modifiable, then the command can also be NONE for one table. However, the command can never be NONE for all tables. Note that, as an alternative, UPDATE can be represented as the tuple (INSERT, DELETE) for each table. Moreover, if multiple tables are modified, then the command can be represented using one command column per table or all possible combination of commands across all modified tables can be encoded in a single command column.

For each table, the storage location must be given if the command is UPDATE or DELETE. As INSERT is only supported for WHEN NOT MATCHED clauses, there can never be a non-null value as the storage location for an INSERT command. Likewise, if the command is INSERT or UPDATE, the new values to insert into the table must be given, whereas these columns logically contain NULL values for DELETE commands.

Table 2 below illustrates the merge action table for the merge statement of Code Listing 1. This example is applicable for any SQL MERGE statement (naturally, the schema of the table must be adapted for the columns containing the new values). The general case, which allows modifications in both tables, is depicted in Table 3 below.

TABLE 2

Merge Action Table for a Merge Operation Modifying One Table (see Listing 1)

| Command | Storage Location | ID | ... | bonus |
|---|---|---|---|---|
| INSERT | — | 183750128 | ... | 3000.00 |
| UPDATE | 123 | 183750129 | ... | 6000.00 |
| DELETE | 124 | — | — | — |
| action | old | row to delete | new row values to insert | |

TABLE 3

Merge Action Table for a Merge Operation Modifying Two Tables A and B

| Command | A.StorageLoc | B.StorageLoc | A.Col1 | ... | B.Col1 | ... |
|---|---|---|---|---|---|---|
| INSERT$_A$, — | — | — | 'foo' | ... | — | — |
| UPDATE$_A$, DELETE$_B$ | 123 | 345 | 'bar' | ... | — | — |
| DELETE$_A$, INSERT$_B$ | 124 | — | — | — | 183750129 | ... |
| actions | row A delete | row B delete | insert A | | insert B | |

In order to compute the merge action table, naturally the matching condition must be evaluated, as explained above. However, it is also desirable to support extended matching conditions in the form of WHEN [NOT] MATCHED AND extra-condition Including the extra-conditions, the merge action table can be computed using a multi-column CASE WHEN expression. Every branch of the case expression corresponds to a when-clause in the merge operation. The conditions in the case expressions must first test the match indicator column of the respective table for NULL values. As explained above, a non-NULL value means a match in the table that was tested for a match (for standard SQL merge this is only the target table). The (non-) NULL value test is then simply ANDed with the extra-condition to compute the final guard expression of the respective when-clause.

Each branch of the case expression returns one entire row of the merge action table. This is where the multi-column case expression comes in handy, as it is capable of returning an entire row as a resulting value. Code Listing 2 below illustrates this for the SQL merge statement of Code Listing 1. Alternatively, each column of the merge action table can be computed independently using a scalar case when expression. In this case, all when-conditions may be repeated across the individual case expressions for each column.

Code Listing 2: Query using a multi-column case
when expression to compute the merge action table

```
SELECT *
FROM (
    SELECT CASE
        WHEN t.storageLocation IS NOT NULL AND s.isFired = 1 THEN
            (DELETE, t.storageLocation, NULL, NULL, NULL, NULL) --
            emit row
        WHEN t.storageLocation IS NOT NULL AND t.salary < s.salary
        THEN
            (UPDATE, t.storageLocation, t.id, t.name, s.salary, s.bonus / 2)
        WHEN t.storageLocation IS NOT NULL THEN
            (UPDATE, t.storageLocation, t.id, t.name, t.salary, 0)
        WHEN t.storageLocation IS NULL AND s.bonus > (SELECT
```

-continued

Code Listing 2: Query using a multi-column case
when expression to compute the merge action table

```
AVG(salary) FROM emp) THEN
    (INSERT, NULL, s.id, s.name, s.salary, s.bonus / 2)
WHEN t.storageLocation IS NULL THEN
    (INSERT, NULL, s.id, s.name, s.salary, s.bonus)
ELSE
    (NULL, NULL, NULL, NULL, NULL, NULL)
END
FROM emp AS t
LEFT OUTER JOIN (SELECT * FROM worldwide_emp WHERE
country = 'GER') AS s
    ON t.id = s.id
) AS mergeActionTable (command, storageLocation, id, name, salary,
```

-continued

Code Listing 2: Query using a multi-column case
when expression to compute the merge action table

```
bonus)
WHERE command IS NOT NULL
```

Before the merge action table is complete, a restriction is required which eliminates all rows that do not cause any modifications in any table. Such rows are not needed for further processing.

Figure 3:
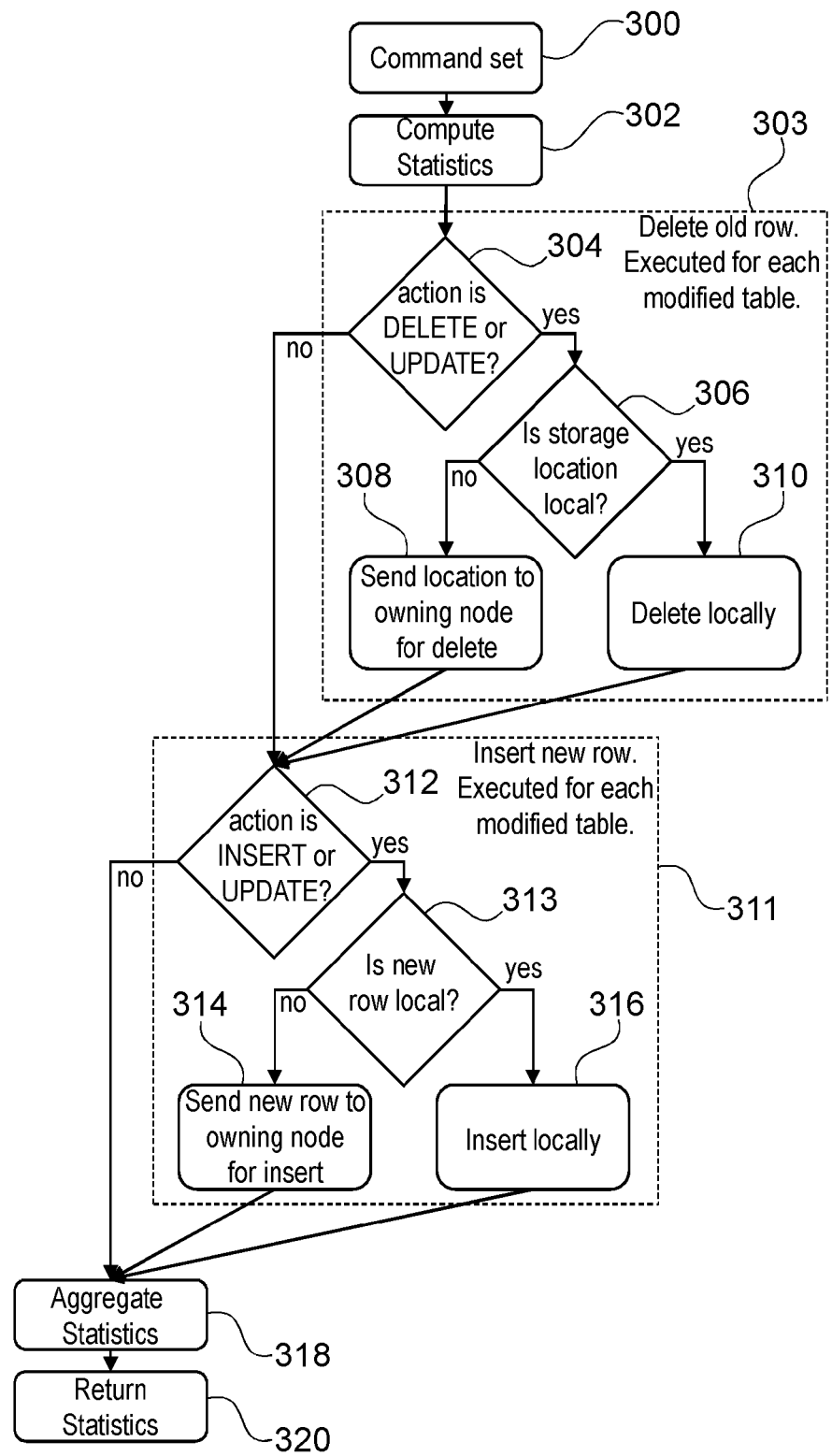
FIG. 3 depicts a method of calculating aggregate statistic when performing the method of FIG. 2 in accordance with one or more embodiments.

A row (a command set) of the merge action table (the merge command list) is computed directly in main memory whenever the join emits a result row. In the same fashion a row of the merge action table can be processed further to execute the actions it describes. The actions are executed by decomposing them into a set of deletes and a set of inserts for each modified table. While it is technically possible (and reasonable) to buffer the actions and execute them in batches, they are conceptually executed immediately as soon as their merge action table row is computed. Note that the join is most likely computed in distributed fashion, i.e. concurrently on many compute nodes. In the same way the merge action table is processed. FIG. 3, which is described below, illustrates the processing steps.

FIG. 3 shows a flowchart which illustrates a method of calculating statistics about the joining of the source dataset and the target dataset that can be performed on the fly as individual command sets are executed in accordance with one or more embodiments. Block 300 represents the execution of a command set. After a command set is performed then the statistics 302 are computed. After the statistics are computed 302 the statistics are aggregated 318 and finally in block 320 the statistics are returned. The computation of the statistics 302 is performed by boxes 303 and 311. Box 303 corresponds to deleting the row or data element for either the source dataset or the target dataset. Box 311 corresponds to inserting a new row or a new element into either the source dataset or the target dataset.

Commands within box 303 are performed by first a decision box 304 in which the question is 'does the dataset comprise a delete or update operation?' If the answer is no, then the method proceeds to block 312. If the answer is yes, then block 306 is performed to ask the question 'is the storage location local?' If the answer is yes, the method proceeds to block 310, if it is no, the method goes to block 308. If block 308 is performed, then the location to the only node is sent to enable that node to delete the data. If the answer was yes, and the method continues at block 310, then the delete is performed locally. After blocks 308 and 310, the method continues at block 312. The question in block 312 is 'is the action an insert or update operation?' If the answer is no, then the method goes to block 318. If the answer is yes, then the method proceeds to question block 313. The question at block 313 is 'is the row on the local node?' If the answer is no, the method proceeds to block 314 and the address of the row is sent to the owning node for insertion. If the answer is yes, then the row or data element is inserted locally. This is in block 316. After the completion of blocks 314 and 316, processing continues at block 318. The processing shown in FIG. 3 can allow for extremely accurate statistics to be aggregated during the performing of the merged command list.

Executing the respective actions of command sets will decompose the merge action table and execution will occur in a distributed fashion. Thus, the point right after the merge action table is computed is the last point where detailed statistics and counters can be collected. For this reason, the first thing that is done with every merge action table row is to increase the individual insert/update/delete counters for each modified table. Moreover, some systems maintain the minimal and maximal value of every column in the database catalog (e. g., for optimizer statistics) and update them with every new row. This must be done at this point as well.

To execute the mandated actions, the command column can be inspected for every modified table. If the command for the current table is UPDATE or DELETE, then the storage location of the old row of the current table contains a valid value. It is examined whether the storage location happens to point to the current compute node, i.e. whether the node which computed this merge action table row also owns the row to delete. This may or may not be the case, depending on the way the distributed join was computed. If the row is local, it is deleted immediately. Otherwise, the storage location is sent to the compute node which owns the row. Upon reception, the owning node is responsible for deleting it. If the command for the current table is INSERT or DELETE, then the respective values of the merge action table must be inserted into the current table. The location of the new row is computed using the distribution strategy of the current table. If the location happens to be the local compute node, then the new row is directly inserted into the current table. Otherwise, the row is sent to the compute node which will own the row. Upon reception, the owning node is responsible for inserting it into the current table.

When all rows of the merge action table have been processed, the statistics and counters are aggregated across all compute nodes. Finally, they are returned as the result and possibly displayed to the user.

Distributed shared-nothing databases can calculate the matching condition as described above. However, some systems keep several (typically three) copies of the same row on different nodes for robustness and efficiency. Performing the join between source and target table as explained will result in a cross-product of the redundant copies. Executing an example as described herein (as described so far) naively, may result in several merge action table rows asking to modify the same copy of a row multiple times.

First of all, it is not per se a problem to delete a row several times, as the delete implementation can be assumed able to cope with this. Moreover, if it is known that exactly n copies of each row exist, the delete implementation can be tuned to simply expect n delete instructions for each deleted row.

Inserting a row, on the other hand, should be done in a more controlled way, as in many cases particular assumptions are expected to be met on the location of the copies of a row. It is thus can be beneficial to create only a single insert instruction and to let the insert implementation create the copies in the appropriate locations. For this reason, a naïve cross-product of the redundant copies is unfavorable for insert commands in the merge action table.

In an embodiment, this is solved by creating specialized join implementations. Executing the distributed join as explained above, it is safe to assume that all copies the same (logical) row of at least one table will be joined on the same compute node. This means that the join implementation is able to detect a cross-product locally. If a cross-product is detected, and in fact every match in a system keeping n copies of each row will create a cross-product, then the resulting merge action table rows are computed differently: the join marks one of the resulting rows of the cross-product (e. g., the first row, e. g., using a counter). This mark is then considered in the case statements to compute the final merge action table rows. For insert actions only marked rows are considered. For delete actions all rows lead to a DELETE command, as all old copies must be removed. For update actions only the marked row leads to an UPDATE command whereas the remaining rows only create DELETE commands.

In the merging of datasets, several different situations may be considered. In one example two datasets to be merged are labelled as the source and target set. In one example at least one of the source and target datasets is a static dataset that is distributed across several computing nodes. It is possible that one of the source and target datasets may be static and distributed across the same nodes. The data may be stored in a central location. And the data may also be stored in one of more continuous streams of data.

Examples may provide for a distributed match checking in merging datasets. This may include calculating for every source dataset row, object or record whether or not there is a match in the target set. This for example may happen through global knowledge. For example if the value is larger than a target maximum this may imply that there is no match. This may also happen through a distribution step that shifts the rows or locations of one or both datasets to different nodes to ensure that if a match for a particular row exists at all it will, after the distribution step, be available on the same node as the row. Thus, the matching condition can then be tested on this node. In other examples, this may happen only locally on the nodes if the data of both sets was already distributed this way before. In some examples any time we move rows or datasets, we add their storage location to them.

In any case, after the distributed matching checking several pieces of information may be known. For example, it may be known which source rows have a match. This knowledge may have been computed on a different node than the data was located before. The original location of the rows may still be known. This may be useful for deleting the data later. It should be noted that if it is needed to insert data the new row may in some instances be inserted at yet another node. This additional node may not be the original location and also not the location where the match was computed.

The overall merged command list which may also be referred to as the merge action table may be computed based on the matching condition and possibly other conditions which determine the actions to take. For example the merged action table may comprise three tuples for one modified dataset, five tuples for two modified datasets or be described as an action, location, and new values. The new values for instance may be given in form of a tuple. Alternatively, the merged action table may be described as insert text here. Theoretically, the merged action table can also be computed on a different node from the node that computed the match. For example, if another node had previously owned some of the old data this may be an efficient way of computing it.

Processing the merged command list or the merged action table may comprise several different steps. This processing may optionally contain inserts and/or updates and/or deletes separately for each modified table. Several steps may be also performed in parallel. The process deletes and process inserts may be performed in parallel. The process deletes may be performed locally or be sent to delete messages to the owning nodes. The process inserts also may be calculated locally or send insert messages to the new owning node or nodes. The owning node could be different depending upon the merged process.

Figure 4:
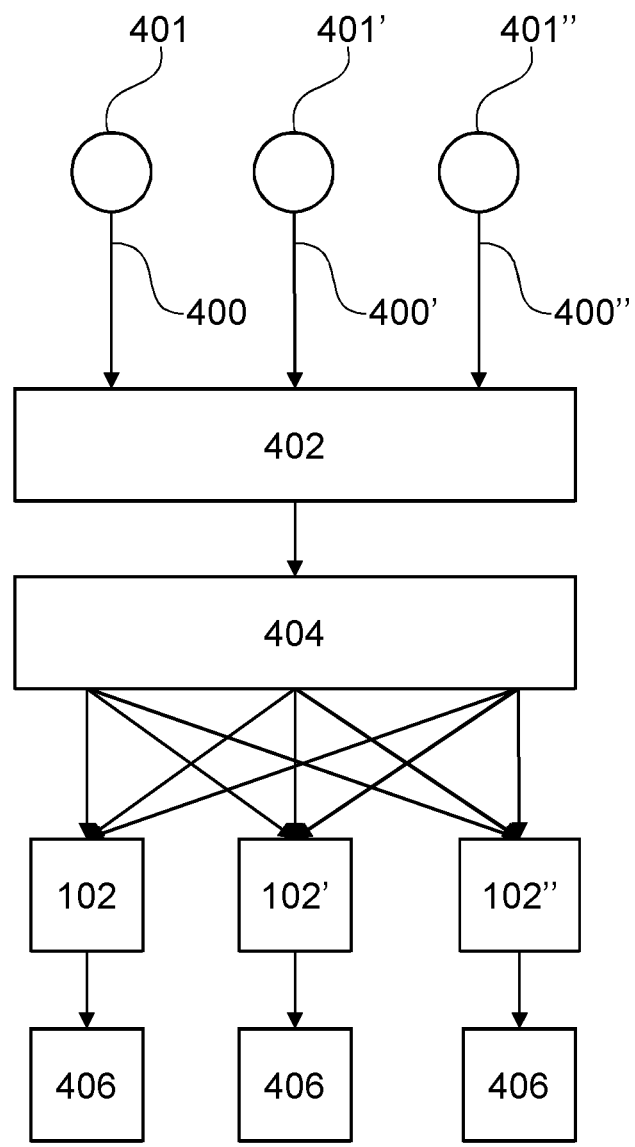
FIG. 4 illustrates the integration of a data stream into the distributed database of FIG. 1 in accordance with one or more embodiments.

FIG. 4 illustrates the merging of a continuous data stream 400, 400', 400" with static data in accordance with one or more embodiments. For example the three data streams 400, 400', 400" may represent data coming from individual sensors 401, 401', 401". The data streams 400, 400', 400" are then sent to a match checker 402. The match checker 402 may for example be a script or other code which identifies relevant data to be merged or aggregates data which is then merged. Next in block 404 a distribution step is performed where the data is copied to various computing nodes 102, 102', 102". If static data is distributed deterministically then the data may be distributed according to rules. This may enable the data to be copied to the correct node for merging.

If the static data is not distributed deterministically to the computing nodes 102, 102', 102" the data from the data streams may be stored in a pseudo random manner or using another distribution algorithm to distribute the data to the nodes. For example if the static data is distributed deterministically and according to the matching conditions then the static data needs no movement. If static data is not distributed deterministically and according to the matching condition then the data in the data stream is distributed and stored in the various nodes and this data from the data stream is checked for merging and the merge is performed in a distributed and parallel manner.

Regardless of how the data from the data streams is distributed to the computing nodes 102, 102', 102''' once the data is stored in the computing nodes 102, 102', 102" the data may then be merged with the static data using the methods and procedures described in FIGS. 1 and 2. The features described in FIG. 4 may be appended to FIG. 1. The data stream can for example be represented as the portions of the source dataset 110, 110', 110", 110''' as shown in FIG. 1. The static data that the data stream is merged with may be represented as the portion of the target dataset 112, 112', 112", 112''' as shown in FIG. 1. For continually merging the data streams 400, 400', 400" with the target dataset 112, 112', 112", 112''', the continuous data streams 400, 400', 400" are repeatedly stored as the portions of the source dataset 110, 110', 110", 110''' and then repeatedly merged with the target dataset 112, 112', 112", 112''' using the method illustrated in FIG. 2.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of operating a distributed database, the method comprising:
executing a join command to merge a source dataset with a target dataset, the executing by multiple computing nodes in the distributed database, the multiple computing nodes for implementing storage and computation for the database management system, the multiple computing nodes connected via a network for exchanging data, and the database management system for managing at least the source dataset and the target dataset, the target dataset being stored in a distributed fashion across the multiple computing nodes, the source dataset comprising multiple source elements, the target dataset comprising multiple target elements, the executing comprising:
checking for a matching condition between a source element selected from the multiple source elements and one of the multiple target elements;
calculating a command set of a merge command list, the command list comprising a list of commands to merge the source element with the target element using the matching condition; and
repeatedly executing the command set to merge the source element with the target dataset before checking for the matching condition between a next source element selected from the multiple source elements and one of the multiple target elements,
wherein the repeated execution of the command set reduces an amount of computing resources required to merge the source dataset with the target dataset, and
wherein the distributed database is a distributed relational database, the source dataset is a source table, the target dataset is a target table, the multiple source elements are included in multiple source rows, the multiple target elements are included in multiple target rows, the source element is included in a source row, and the command set is included in a command column.

2. The method of claim 1, further comprising deleting the command set before calculating a next matching condition between the next source element selected from the multiple source elements and one of the multiple target elements.

3. The method of claim 1, wherein each of the multiple nodes comprises a main memory, the command set is calculated by a selected node of the multiple nodes, and the command set remains in the main memory of the selected node.

4. The method of claim 1, wherein the command set comprises inserts, updates, deletes, and a storage location of the target dataset, and wherein the command set is configured to be applied to the target dataset.

5. The method of claim 4, wherein the command set further comprises attribute values to be entered for the target data element upon merging the source element with the target dataset.

6. The method of claim 4, further comprising separately counting a number of inserts, updates, and deletes performed for the complete merge command list.

7. The method of claim 1, wherein the distributed database is a distributed shared-nothing database.

8. The method of claim 1, wherein one or both of the source dataset and the target dataset is modified during execution of the command set.

9. The method of claim 1, wherein the source dataset contains multiple copies of one or both of the source element, and the target dataset contains multiple copies of the target element.

10. The method of claim 1, wherein the repeated execution of the command set results in a join set distributed on the set of computing nodes.

11. The method of claim 1, wherein the merge command list includes a list of commands for merging the source dataset into the target dataset.

12. The method of claim 1, wherein one or both of the source dataset and the target dataset is a static dataset.

13. The method of claim 1, wherein the source dataset is stored in a distributed fashion across the multiple computing nodes.

14. The method of claim 1, wherein the source dataset includes at least one data stream.

15. A distributed database, the distributed database comprising:
    multiple nodes for implementing storage and computation for a database management system, the multiple nodes being connected via a network for exchanging data;
    a database management system for managing at least a source dataset and a target dataset, the target dataset being stored in a distributed fashion across the multiple computing nodes, the source dataset comprising multiple source elements, the target dataset comprising multiple target elements;
    a memory having computer readable instructions; and
    a plurality of processors located on the multiple nodes for executing the computer readable instructions, the computer readable instructions comprising:
    executing a join command to merge a source dataset with a target dataset, the executing comprising:
    checking for a matching condition between a source element selected from the multiple source elements and one of the multiple target elements;
    calculating a command set of a merge command list, the command list comprising a list of commands to merge the source element with the target element using the matching condition; and
    repeatedly executing the command set to merge the source element with the target dataset before checking for the matching condition between a next source element selected from the multiple source elements and one of the multiple target elements,
    wherein the repeated execution of the command set reduces an amount of computing resources required to merge the source dataset with the target dataset, and
    wherein the distributed database is a distributed relational database, the source dataset is a source table, the target dataset is a target table, the multiple source elements are included in multiple source rows, the multiple target elements are included in multiple target rows, the source element is included in a source row, and the command set is included in a command column.

16. A computer program product for operating a distributed database, the computer program product comprising a computer readable storage medium having program instructions embodied therewith, the program instructions executable by processors of multiple computing nodes to cause the processors to perform:
    joining a source dataset with a target dataset, the target dataset being stored in a distributed fashion across the multiple computing nodes, the source dataset comprising multiple source elements, the target dataset comprising multiple target elements, the joining comprising:
    checking for a matching condition between a source element selected from the multiple source elements and one of the multiple target elements;
    calculating a command set of a merge command list, the command set comprising a list of commands to merge the source element with the target element using the matching condition; and
    executing the command set to merge the source element with the target dataset before checking for the matching condition between a next source element selected from the multiple source elements and one of the multiple target elements,
    wherein the repeated execution of the command set reduces an amount of computing resources required to merge the source dataset with the target dataset, and
    wherein the distributed database is a distributed relational database, the source dataset is a source table, the target dataset is a target table, the multiple source elements are included in multiple source rows, the multiple target elements are included in multiple target rows, the source element is included in a source row, and the command set is included in a command column.

17. The computer program product of claim 16, wherein the instructions further cause the processors to delete the command set before calculating a next matching condition between a next source element selected from the multiple source elements and one of the multiple target elements.

18. The computer program product of claim 16, wherein each of the multiple computing nodes comprise a main memory, the command set is calculated by a selected node of the multiple nodes, and the command set remains in the main memory of the selected node.

19. The computer program product of claim 16, wherein the command set comprises inserts, updates, deletes, and a storage location of the target dataset, and wherein the command set is configured to be applied to the target dataset.

* * * * *